Oct. 12, 1926.
J. R. McFALL
WHEEL
Filed July 18, 1924
1,602,984
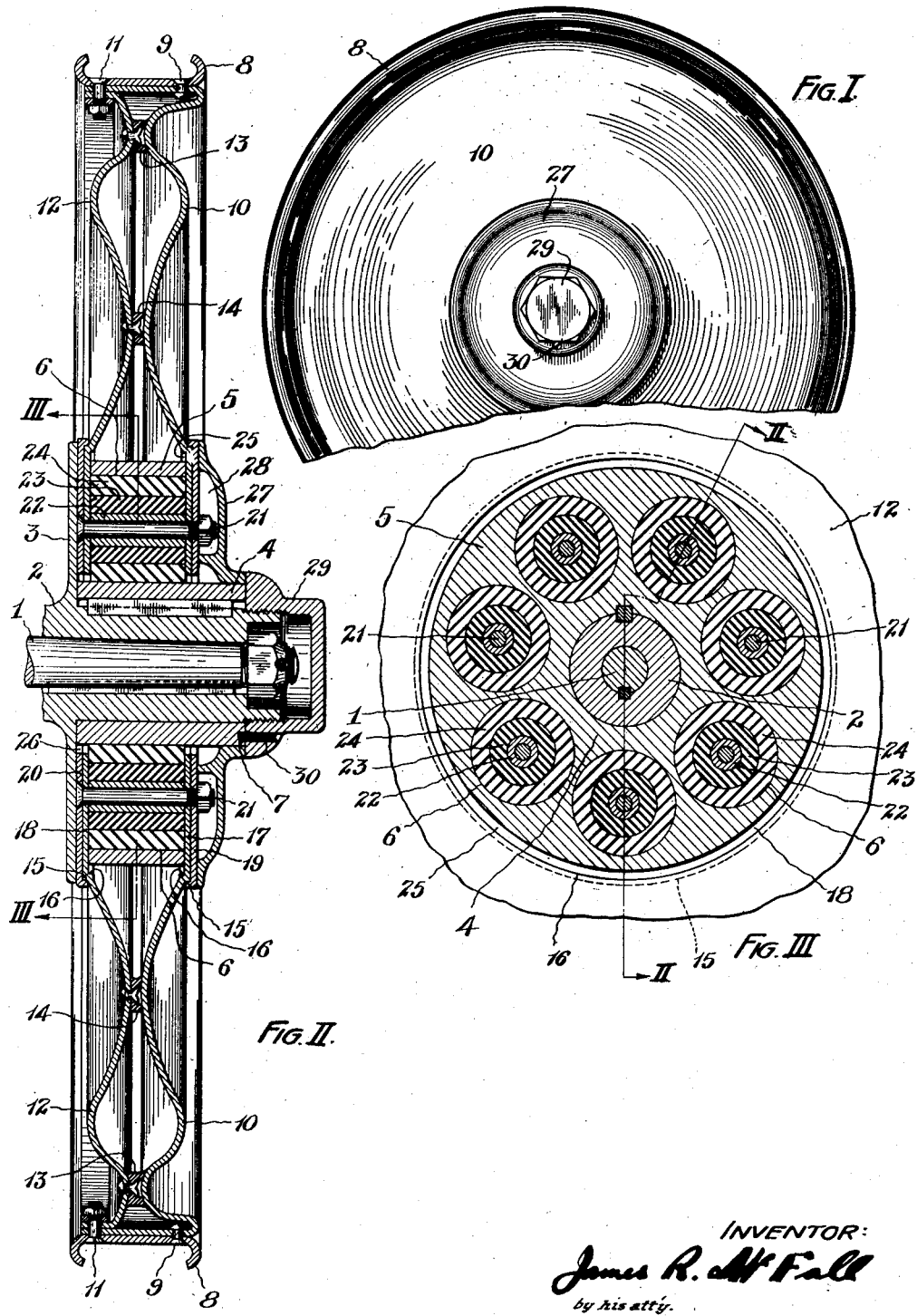
Fig. I
Fig. II
Fig. III
INVENTOR:
James R. McFall
by his atty.

Patented Oct. 12, 1926.

1,602,984

UNITED STATES PATENT OFFICE.

JAMES R. McFALL, OF CLEVELAND, OHIO.

WHEEL.

Application filed July 18, 1924. Serial No. 726,727.

My invention pertains to a wheel and more particularly to a resilient wheel in which, however, the yielding action is not primarily due to any inherent resiliency of spokes nor of the discs exemplified by the drawings, but rather to interposed compressible elements which are part of a connection between the hub and the discs.

The object of my invention is the design of a resilient wheel which will approximate noiselessness and in which every part will participate either in sustaining loads or in resisting the varying stresses which a wheel encounters during service. A further object is to provide a structure which will resist twisting or creaking of the rim due to side sway or lurching, through the agency of my peculiar cross-sectional shape of discs and their connection with each other. I exemplify one principle of my invention by employment of a hub flange confined between the nave sections of the two discs together with a series of circumferentially arranged buffer units which are additionally confined within the hub flange and which are part of a yieldable connection between the hub and discs.

Adverting to the drawing:—

Fig. I is a partial outside elevation view of the wheel embodying my invention.

Fig. II is an axial cross-sectional view, only the axle being shown in elevation, the section line II—II on which this view is taken being indicated in Fig. III.
Fig. III is a cross-section through the median circular plane on line III—III of Fig. II.

An axle 1 has keyed upon it a hub 2 provided with an annular flange 3. The hub 2 is shown held in place by a nut which is carried by the end of the axle. Keyed in turn upon the hub 2 is an auxiliary hub 4 having a web portion 5 which is provided with a series of, as shown with seven, circumferentially arranged holes 6 all of which extend in a direction substantially parallel with the axis of the wheel. The outer edge surface of the hub 4 is fashioned with a screw-threaded opening 7 the purpose of which will be later explained.

A rim 8 has attached to its inner side by rivets 9 an annular disc 10, and has also attached to its inner side by bolts 11 both the disc 10 and another disc 12. The disc 10 is the one on the outer side of the wheel. It will be observed that the discs 10 and 12 are of peculiar cross-sectional shape and that the outer annular edge portion of the disc 10 lies against the inner surface of the rim 8 and extends across to be interposed between the outer annular flange of the disc 12 and the rim 8. Sheet rubber silencers 13 and 14 are carried by the inner disc 12 and abut the disc 10 along the two circular lines of nearest approach of the discs 10 and 12 respectively, thereby furnishing and yielding mutual reinforcement of the discs against side sway involving cantilever stresses. The bolts 11 facilitate assembly or disassembly of the two discs with respect to each other. The inner or nave sections of the discs 10 and 12 are fashioned some distance from the hub 4 with duplex shoulders 15 and 16 respectively and then continue in parallel relationship at 17 and 18 to enclose and abut opposite sides of the hub flange 5. A pair of annular hub plates 19 and 20 in turn confine the annular nave edge portions 17 and 18 of the discs by embracing the shoulders 15 and 16, and the plate 20 abuts the hub flange 3 as may be seen in Fig. II. A circumferential series of seven bolts 21 pass through the holes 6 and through registering holes in both discs and both plates, the head of the bolt being countersunk and abutting the flange 3.

Instead of having the discs 10 and 12 abutting the hub 4 and thus, in conjunction with the agency of the bolts 21, forming a rigid connection therewith, I vary the connection in accordance with one feature of my invention. Surrounding each bolt 21 between the disc nave sections 17 and 18 is a metal wearing sleeve 22 and in turn surrounding the sleeve 22 is a compressible rubber sleeve 23 and in turn surrounding the sleeve 23 is a softer or more readily compressible rubber sleeve 24. The sleeves 22, 23 and 24 are of cylindrical shape and in telescopic connection. The outer rubber sleeve 24 is fitted to the holes 6. Accordingly, the structure connecting my discs with a hub includes composite cushioning devices which are circumferentially arranged about the wheel axis. The play of the bolts 21 relative to the walls of the holes 6 is determined by the amount of compressibility of the sleeves 23 and 24 and of course varies according to road condition and carried load. However, in order to permit of the relative radial or compound relative action between the hub flange 5 and the nave sections 17 and 18 of the discs, the latter have their opposed shoulders 15 and 16 spaced a suitable distance 25 from the outer cylindrical surface of the hub 5; and also the annular nave edges of the discs 10 and 12 as well as of the plates 19 and 20 which must move in unison therewith are spaced at 26 from the hub 4.

An annular friction plate 27 slips around the outer end of the hub 4 and is provided with an annular recess 28 to be occupied by the nut on the bolt 21. The plate 27 will be seen to contact the hub 4 and the hub plate 19 on opposite sides of the circular line of the bolts. The friction plate 28 is held in place by a hub cap 29 which may be locked by a set screw 30 adapted to co-operate with the tapped hole 7.

In operation, whenever my wheel is rotating in service there will be a yielding action due to the compression of the rubber sleeves in varying directions. I wish particularly to emphasize that all of the rubber sleeves will functionate continuously, each taking some of the stress on all expectable lines of resistance. My aim to produce a wheel tending to an equalization of stress assumption irrespective of position, load or speed has been realized.

I claim:—

1. In a wheel the combination of a hub an auxiliary hub demountably carried thereby, a rim, a pair of opposed annular concavo-convex discs surrounding and spaced radially from said auxiliary hub, said discs alternately approaching and receding from each other in coaxial planes and secured together at said hub and at said rim, cushioning devices carried between said discs at points of proximity thereof intermediately of said hub and rim and a yielding connection between said discs and auxiliary hub.

2. In a wheel the combination of a hub, an auxiliary hub demountably carried thereby, a pair of opposed annular discs surrounding and spaced radially from said auxiliary hub, compressible elements abutting the interior of each disc and adapted to be compressed in a direction parallel with the wheel axis and a structure connecting said auxiliary hub and discs and including circumferentially arranged yielding elements.

3. In a wheel, the combination of a hub fashioned with a flange, and an annular structure surrounding said hub, said structure including; an auxiliary hub surrounding the main hub, a pair of annular discs having inner edges in spaced relation to each other and spaced radially from said auxiliary hub, circumferentially arranged cushioning devices interiorly of said auxiliary hub and adapted to be compressed against said auxiliary hub, a friction plate adapted to cooperate with said hub flange to confine the other parts of the said structure and means for holding the parts in position.

4. In a wheel, a hub, a rim and an intermediate connecting structure including a pair of discs spaced radially from the hub and carrying cushioning devices each composed of a plurality of rubber cylinders in telescopic connection and adapted to be compressed against said hub and mechanism including hub plates interlocking with the outer sides of said discs respectively to secure said discs together.

5. In a wheel, a hub, a pair of concavo-convex discs having annular portions in proximity, mechanism including a circumferentially arranged series of bolts for holding the inner sections of said discs in predetermined spaced relation together with rubber buffers carried by said bolts and radially compressible and other axially compressible buffers between the proximate portions of said discs.

6. In a wheel, a hub, a rim, and a structure including; a pair of discs formed with annular shoulders and detachably connecting said hub and rim, a circumferentially arranged series of yielding elements interposed between said discs, a pair of annular hub plates outwardly contiguous to said discs and in interlocked connection with said shoulders, and means for holding the parts of said structure together.

7. In a wheel, a hub, a rim, and a structure including; a pair of discs detachably connecting said hub and rim, said structure furthermore including a circumferentially arranged series of yielding elements interposed between said discs, a pair of annular hub plates, said discs and plates being fashioned one pair with annular shoulders and the other pair with complementary annular flanges adapted to conform to said shoulders, and means for holding the parts of said structure together.

8. In a wheel, the combination of a hub provided with circumferentially arranged openings, a pair of discs embracing the sides while spaced radially from said hub, a structure for connecting said discs and hub including annular hub plates abutting distinct sides of said discs respectively and likewise spaced radially from said hub and also including compressible spacer elements between said discs, means for holding said plates, discs and spacer elements in position and other compressible spacer elements between said discs.

9. In a wheel, the combination of a hub, a pair of concavo-convex discs inversely opposed to each other surrounding said hub, and a structure for connecting said discs and hub including an auxiliary hub provided with circumferentially arranged axially extending openings, annular hub plates laterally of said discs and compressible spacer elements occupying said openings with their ends abutting said discs means for holding said plates, discs and spacer elements in position, other compressible elements between said discs in radially spaced relationship, and means for holding the latter in position.

10. In a wheel, the combination of a hub, a rim, a structure connecting said hub and rim and including a pair of annular discs alternately bent toward and away from each other and both having an outer section connected with said rim, together with a compressible muting element fitted between said discs at a point of proximity thereof, the inner sections of said discs being spaced radially from said hub and a yielding connection between said hub and the inner sections of said discs.

Signed by me, this 21st day of June, 1924.

JAMES R. McFALL.